United States Patent [19]
Herbenar

[11] 4,035,094
[45] July 12, 1977

[54] BALL AND SOCKET JOINT

[75] Inventor: Edward J. Herbenar, Birmingham, Mich.

[73] Assignee: TRW Inc., Cleveland, Ohio

[21] Appl. No.: 666,017

[22] Filed: Mar. 11, 1976

[51] Int. Cl.² .......................................... F16C 11/06
[52] U.S. Cl. ................. 403/144; 403/138; 403/136
[58] Field of Search .......... 403/138, 144, 136, 137, 403/129, 135, 140, 124, 125

[56] References Cited

U.S. PATENT DOCUMENTS

| | | | |
|---|---|---|---|
| 2,182,601 | 12/1939 | Venditty | 403/144 X |
| 2,838,330 | 6/1958 | Fidler | 403/138 X |
| 2,880,025 | 3/1959 | Herbenar et al. | 403/133 |
| 3,004,786 | 10/1961 | Herbenar | 403/140 |
| 3,667,789 | 6/1972 | McNeely et al. | 403/140 X |
| 3,790,195 | 2/1974 | Herbenar | 403/124 |

FOREIGN PATENT DOCUMENTS

| | | | |
|---|---|---|---|
| 873,022 | 4/1953 | Germany | 403/124 |

Primary Examiner—Andrew V. Kundrat

[57] ABSTRACT

An improved ball and socket joint usable in a steering system includes a stud having an enlarged head or ball portion and a socket having a cavity closed by an end cap, the socket cavity being adapted to receive the stud head therein. An expander, such as a belleville spring, is resiliently compressed between the end cap and the head. The expander is the sole item interposed between the end cap and the head and serves the dual role of expander and supplemental seat for the head. The expander has a center opening, through which the head directly contacts the end cap and is pre-loaded by it. As the assembly sustains wear, the expander comes into play to maintain loading on the head and to keep the head seated on the expander. Problems of tolerance stackup are avoided by preloading the end cap directly by the head, and utilizing the expander as the supplemental seating means. By initially compressing the expander to a fully flattened state, travel of the expander to full relaxation is available to take up wear.

12 Claims, 9 Drawing Figures

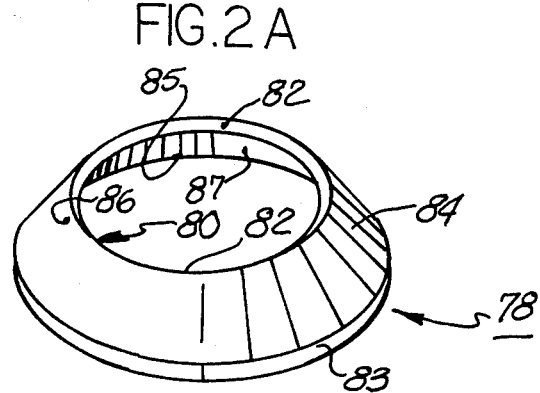
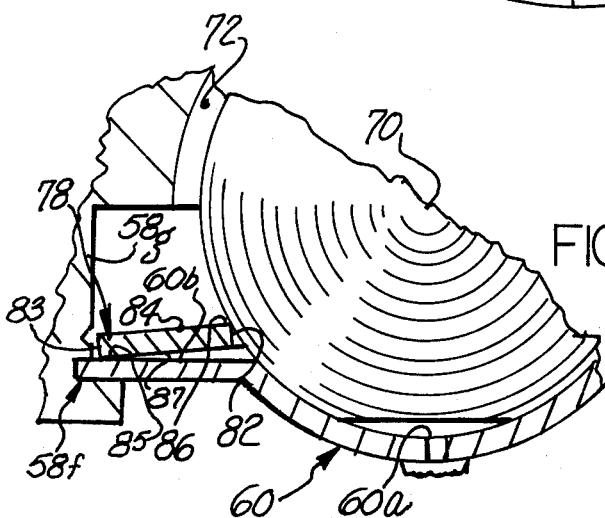
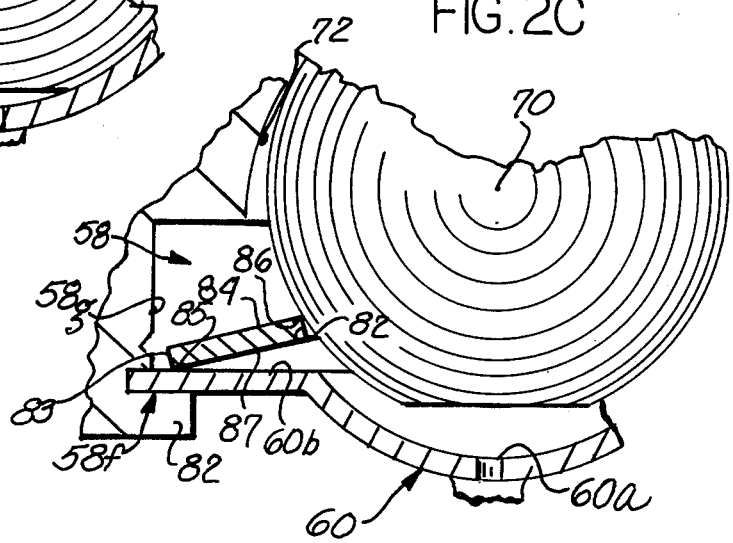
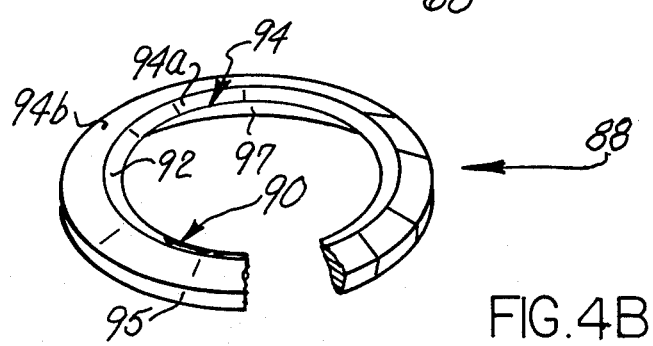

BALL AND SOCKET JOINT

BACKGROUND OF THE INVENTION

The present invention relates to a new and improved joint assembly, more specifically to a ball and socket type joint assembly. The joint assembly of the invention is one which may advantageously be utilized in a vehicle steering system, although it will be apparent that its use is not so limited. Known vehicle steering systems commonly include a plurality of components, e.g., a center link idler arm, pitman arm, etc., which are interconnected by ball and socket joints to permit multi-directional movement among them. Obviously, such ball and socket joints have any number of other well known uses aside from steering systems, generally whenever multi-directional movement is required between interconnected members.

A common problem for ball and socket joints, whether used in steering systems or other devices, is the necessity to maintain the various components of the joint assembly in proper operating position relative to each other despite the effect of wear on the components. Usually, this is accomplished by incorporating compressed expanders or springs into the assembly to "take up wear" by expanding as adjacent parts wear down, to maintain the wear-reduced parts in properly seated engagement. One problem is to provide for sufficient expander travel to avoid looseness even at maximum allowable wear. Another problem is to maintain dimensional tolerances of the various components within narrow limits so that misalignment of the assembled components and excessive friction therebetween is not sustained. Since the dimensional tolerances of assembled components accumulates ("tolerance stack up") individual tolerances must be held very close, which increases manufacturing cost. The use of both expanders and bearing elements to seat the stud head or ball increases the number of parts and aggravates the tolerance stack up problem.

The art has attempted numerous expedients to overcome these problems. For example, U.S. Pat. No. 3,667,789 shows a ball and socket joint including a belleville spring type expander engaging a bearing plate which is disposed in engagement with a ball element on a stud head. The problem of tolerance stack up of the parts is sought to be overcome by including a nonresilient, crushable component in the structure. This component is crushed upon assembly to take up dimensional variations in the assembled parts.

U.S. Pat. No. 2,528,221 shows a ball and socket joint wherein the ball or head portion is composed of two separable hemispherical components. The two components are maintained in seating contact with the socket cavity by means of an expander disposed internally of the assembled components.

The foregoing prior art attempts have to a greater or lesser extent typical shortcomings; one is the requirement to include extraneous parts of the assembly, which increases costs and complicates parts inventory and manufacturing procedures. Another is the limited amount of expander travel available to take up wear.

SUMMARY OF THE PRESENT INVENTION

In accordance with the present invention, there is provided a ball and socket joint assembly comprising a stud having a ball or enlarged head portion and a socket having a cavity adapted to receive the enlarged head. The socket cavity is closed by an end cap. An expander or spring, preferably a belleville spring, is positioned within the cavity and compressed between the head and the end cap. The end cap bears against the head to preload the stud and fix the head in bearing engagement within the cavity. The expander is the sole member interposed between the head and the end cap so as to transmit stud preloading forces therebetween.

Preferably, the expander has an opening formed therein to permit direct contact between the end cap and the head so that the end cap can initially directly preload the head without acting through the expander. With the head thus preloaded directly by the end cap until some wear, and resultant change in part dimensions, is sustained. When such wear and dimension change does occur, the expander expands towards its relaxed, uncompressed state and thereby urges the head towards the cavity to maintain bearing contact therebetween. Such expansion of the expander also keeps the head seated on the expander as the head moves away from engagement with the rigidly affixed end cap.

Since only the expander is interposed between the head portion and the end cap, the use of extraneous bearing and/or seating elements is avoided, so the problem of tolerance stackup is minimized. The expander preferably engages an area of the head to define an annular area of head-expander contact.

Preferably, the expander is a belleville spring having a central aperture formed therein, the diameter of the central aperture being sized so that when the end cap loads the head, the belleville spring is in a substantially flattened condition. This makes available the full amount of expander travel towards its relaxed condition to take up wear. The center-apertured belleville spring also serves as a seat for the stud head, thus serving a dual function; both wear takeup expander and seat for the stud head.

It is accordingly an object of the invention to provide a new and improved ball and socket joint assembly which maximizes the amount of expander travel available to take up wear, provides preloading of the stud head by the end cap, minimizes or avoids the problems of tolerance stackup, and provides a simple and efficient construction.

It is another object of the invention to provide a new and improved ball and socket joint assembly in which problems of tolerance stackup and expander loading to compensate for wear are solved in a simple and efficient manner, by providing a dual function (expander) member to serve both as an expander and a secondary seat for the head portion, and in which the number of components required for the joint assembly is reduced.

BRIEF DESCRIPTION OF THE DRAWINGS

The foregoing and other objects and features of the invention may better be illustrated by a description of specific embodiments of the invention, of which the accompanying drawings are a part and wherein:

FIG. 2A is an enlarged (relative to FIG. 2) perspective view of the expander used in the joint assembly of FIG. 2;

FIG. 2B is an enlarged fragmentary sectional view illustrating the initial relationship between the expander of FIG. 2A and a ball head of the ball and socket joint;

FIG. 2C is an enlarged fragmentary sectional view similar to FIG. 2B, illustrating the relationship between the expander and the ball head after some wear of the components of the ball and socket joint has occurred;

FIG. 4B is an enlarged (relative to FIG. 4) perspective view of the expander used in the joint assembly of FIG. 4.

Referring now to FIG. 1, a steering linkage is generally indicated at 10 and includes a center link 12 connected at its opposite ends to an idler arm 14 and a pitman arm 16 by associated ball and socket joints 18 and 20. Bracket 15 serves to mount idler arm 14 to the vehicle chassis. A pair of tie rods 22, 24 are each connected to center link 12 and to their associated wheel bracket 26, 28 by ball and socket joints 32, 34, 36 and 38. Pitman arm 16 is actuated by a steering wheel (not shown) to provide a turning action on vehicle wheels 40 and 42.

Referring to FIG. 2, there is generally indicated at 50 one embodiment of a ball and socket joint assembly in accordance with the invention and usable, for example, in linkage 10 for the ball and socket joints 32, 34, 36 and 38. Ball and socket assembly 50 includes a metal socket 52 having an arm 53 on which is a threaded portion 54 adapted to engage any suitable member to which the joint assembly is to be connected, such as the tie rods 22 and 24. Socket 52 includes a metal socket housing 56 within which a housing cavity 58 is formed. Cavity 58 has a bearing portion 58a with an annular bearing surface which forms part of a sphere. An enlarged seat portion 58b is connected with the bearing portion 582 and has a cylindrical configuration with a radius which is greater than the radius of curvature of the bearing portion. (A portion of head 70 is broken away in FIG. 2 to better show bearing portion 58a). The seat or lowermost portion 58b (as viewed in FIG. 2) of cavity 58 is closed by a circular end cap 60 which is held in place by an annular turned-over lip 62 formed by swaging material from socket housing 56 over the end cap. The metallic end cap 60 has concave seating depression 60a formed in the center thereof.

Figure 1:
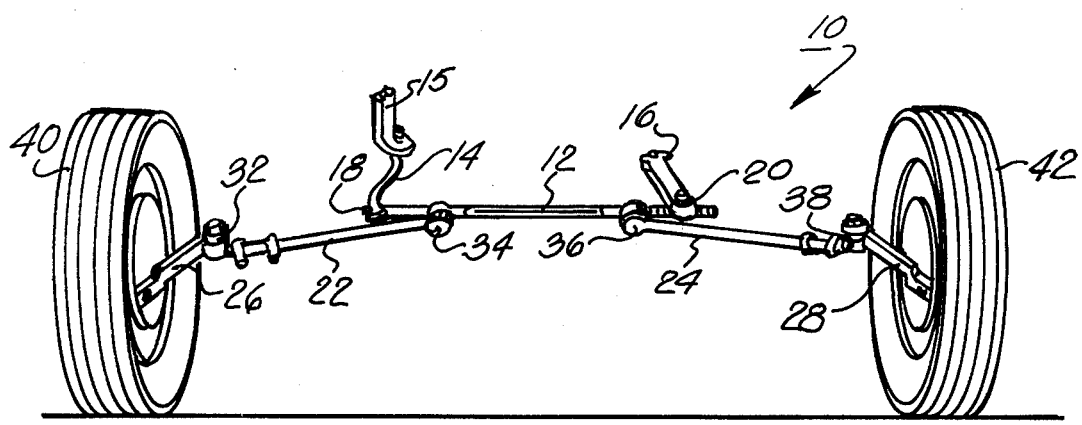
FIG. 1 is a schematic illustration of an automobile steering linkage utilizing ball and socket joints such as those provided by the present invention.

A metallic ball stud 64 has a stem 66 having a threaded portion 68 adapted, like threaded portion 54, to engage any suitable member. Threaded portions 54 and 68 thus serve to connect the ball and socket joint assembly between two appropriate members such as the tie rod 22 and bracket 26. The stem 66 is integrally formed with the head 70 and extends through an opening 58c in the housing 56. The opening 58c is defined by a generally frustroconical surface 58d which is disposed in a coaxial relationship with the bearing portion 58a and cylindrical seat portion 58b.

Ball stud 64 has a generally spherical ball or enlarged head 70 formed at one end thereof. The polar or distal end 70a of head 70, i.e., the end remote from stem 66, has an annular surface portion which directly contacts end cap 60 without another member or structure intervening between them to interrupt such contact. The depression 60a in the end cap 60 has the same radius of curvature as the head 70 to provide for smooth abutting sliding engagement between the head 70 and end cap 60 upon rotation or oscillation of the stem 66.

The bearing portion 70b of head 70 forms a portion of a sphere and is received within and abuttingly engages the bearing portion 58a which has the same radius of curvature as the head 70. An arcuate lubricating groove 72 is formed in bearing portion 58a to carry a suitable lubricant. A sealing collar 74, made of a resilient material such as synthetic or natural rubber, engages an outer portion of housing 56 and has an opening 76 therein through which stem 66 protrudes. The sealing collar 74 cooperates with the housing 56 to form a cavity 74a which is filled with a supply of lubricant. The groove 72 conducts lubricant between the cavity 74a and the cavity 58b which is also filled with lubricant. Ball stud 64 is thus free to rotate and oscillate in any direction relative to housing 56 in the known manner, the cavity 58b being maintained full of lubricant and sealing collar 74 resiliently yielding to the motion of stem 66.

Figure 2:
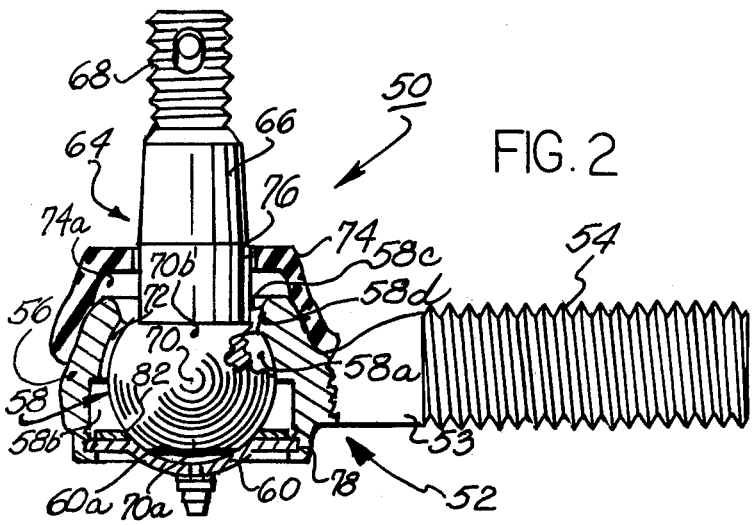
FIG. 2 is a section view in elevation of a ball and socket joint in accordance with the present invention.

A spring or expander comprising a belleville type spring 78 is disposed between end cap 60 and head 70. As best seen in FIG. 2A, the annular metal spring 78 has a circular center opening 80, the peripheral area of which defines a cylindrical inner surface 82 which (as seen in FIG. 2) engages a portion of the spherical head 70 intermediate of ends 70a, 70b. A cylindrical outer surface 83 is coaxial with the inner surface 82. The spring 78 is illustrated in FIG. 2A in its relaxed condition, in which it has a dished shape providing a frustroconical major outer side surface 84 and a frustroconical major inner side surface 87. The inner and outer minor side surfaces 82 and 83 extend perpendicular to the major side surfaces 84 and 87. Referring again to FIG. 2, spring 78 is seen to be resiliently compressed and substantially flattened between head 70 and end cap 60 in the completed assembly.

To assemble the joint 50, the head 70 of the ball stud 64 is placed in the bearing cavity 58 with the stem 66 extending through the opening 58c in the housing 56. The belleville spring 78 is placed in position against the head 70 with the circular inner surface 82 of the spring in axial alignment with an encircling low polar end portion (as used in FIG. 2) of the head 70. The circular end cap 60 is then placed in abutting engagement with the expander spring 78. It should be noted that at this time the circular end cap 60 and spring 78 are disposed in axial alignment with the cylindrical cavity 58b and the bearing portion 58a. A predetermined load is then applied to the end cap 60 to press it toward the housing 56. As this occurs, the expander spring 78 is resiliently compressed from the relaxed condition of FIG. 2A to the substantially flat preloaded position of FIG. 2 by the pressure of the end cap 60 against the relatively large diameter outer end portion of the expander spring. When the predetermined load has been applied against the end cap and the spring 78 has been deflected to the preloaded position of FIG. 2, the head 70 extends through the circular central opening in the spring and is disposed in abutting engagement with the depression 60a in the end cap 60. The depression 60a has an inner surface which forms part of a sphere having the same radius as the spherical outer surface of the head 70 and the bearing surface.

While the predetermined load is being applied against the end cap 60 to hold the spring in its resiliently deflected position, the end cap is rigidly locked in place by swaging a lowermost (as viewed in FIG. 2) end portion of the housing 56 over the circular peripheral edge of the end cap 60 to form an annular lip 62 in much the same manner as disclosed in U.S. Pat. No. 3,464,723 to Herbenar. The diameter of the center opening 80 in the expander spring 70 is such that, with the end cap 60 contacting the polar end 70a of the head 70, the expander spring is resiliently compressed to a substantially flat configuration. Although the spring 78 is positioned between the head 70 and the end cap 60, the circular opening 80 in the spring 78 permits direct contact between the head 70 and cap 60, uninterrupted by the spring 78. Therefore, the initial preloading of the head 70 is accomplished by the end cap 60 and the spring 78.

When the socket assembly 50 is in the assembled condition, a relatively large diameter circular outer rim 85 of the expander spring 78 is pressed against an inner surface 60b of the end cap 60 (see FIG. 2B). The rim 85 includes a corner formed between the annular outer surface 83 and the inner surface 87 of the spring 78. Similarly, a circular inner rim or seat 86 formed at the intersection of the inner surface 82 and the side 84 of the spring 78 is disposed in abutting engagement with the spherical outer surface of the socket head 70. The spring 78 is held in the substantially flat deflected condition against the influence of its own natural resilience by the socket head 70 and end cap 60. It should be noted that the circular outer surface 84 of the spring 78 is spaced apart from inner surface 58g of the cavity 58 and the spring is free to move from its substantially flat fully compressed condition illustrated in FIG. 2 upon wear of either the ball head 70 or the bearing portion 58a.

During use, proper engagement of the assembly parts is initially maintained by the preloading of head 70 and stud 66 by the end cap 60 and the spring 78. After final assembly, and before substantial wear is incurred, spring 78 serves mainly as an aid in properly seating head 70 of stud 66 in end cap 60, and as an anti-rattle device. As the parts are subjected to wear in use, looseness or misalignment of parts is prevented by resilient expansion of spring 78 against head 70. Since spring 78 is, upon assembly, in a substantially flattened condition, the entire amount of expansion travel between its flattened condition (FIG. 2) and its frustroconical relaxed condition (FIG. 2A) is available to take up wear.

As the parts wear, the ball head 70 is pressed against the bearing portion 58a by the relatively stiff spring 78. As this occurs, the ball head 70 moves radially inwardly away from the recess 60a in the end cap 60 in the manner illustrated in FIG. 2C. During this inward movement of the ball head 70, the spring 78 resiliently flexes from the fully deflected position of FIG. 2B toward the relaxed position of FIG. 2A. As the spring 78 flexes, the outer surface 83 moves away from a cylindrical sidewall 58g of the cavity 58 (FIG. 2C). The inner seating rim 86 is maintained in firm pressure engagement with the ball head 78 to continuously press the ball head against the bearing portion 58a. Since the dimensional changes in the parts occasioned by wear are relatively small, even at the point of maximum allowable wear of the joint assembly, proper engagement and alignment of the parts without looseness is maintained throughout the life of the joint assembly.

With increasing wear, spring 78 takes over as the sole means to seat head 70, which is lifted out of depression 60a as spring 78 travels towards its relaxed condition in response to wear.

Belleville spring 78 serves a dual function both as a seat for head 70 (initially in cooperation, in the embodiment shown, with concave portion 60a of end cap 60) and as an expander to take up wear of the parts. If sufficient wear occurs to unseat head 70 from seating depression 60a, seating rim 86 of spring 78 serves as the seat. Utilizing spring 78 to serve the dual functions of seat and expander device permits elimination of additional bearing members, collars, etc.

Figure 3:
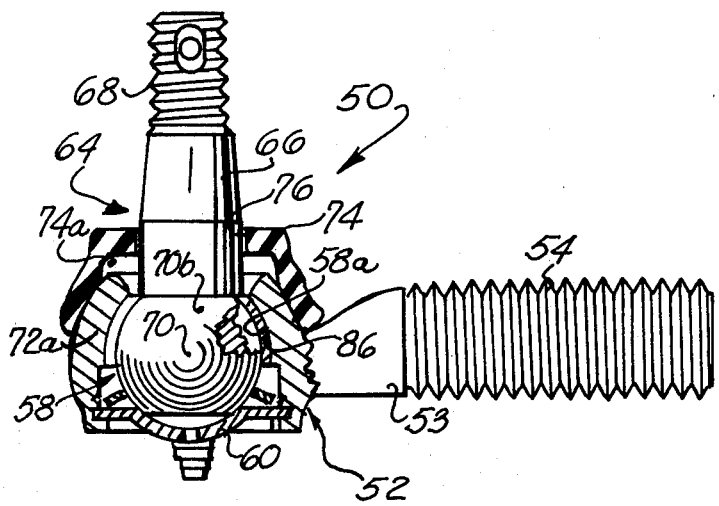
FIG. 3 is a section view in elevation of another embodiment of a ball and socket joint in accordance with the present invention.

Referring now to FIG. 3, there is shown another embodiment of the invention which is similar to that of FIG. 2 in most respects, and corresponding parts are identically numbered as in FIG. 2. The FIG. 3 embodiment however, includes a free bearing 86 of truncated hemispherical shape interposed between head 70 and bearing portion 58a of the cavity 58. A portion of ball 70 is broken away to better show bearing 86. Bearing 86 may be made of any suitable metal such as hardened steel or of plastic (i.e., any synthetic organic polymeric compound such as high density polyethylene, etc.) having suitable structural properties.

A lubricating groove 72a is formed in the interior surface of bearing 86 to carry a suitable lubricant. Oscillating and rotating motion are taken between the hardened interior surfaces of bearing 86 and head 70. The lubricating groove obviously may, in any of the embodiments, be formed in head 70.

Figure 4:
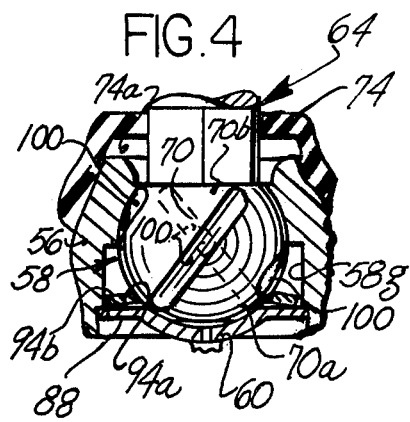
FIG. 4 is a partial section view in elevation of yet another embodiment of the invention, prior to final assembly thereof.

Referring now to FIG. 4, there is shown a partial view of another embodiment of a ball and socket joint in accordance with the invention. FIG. 4 shows the joint prior to final assembly and prior to the positioning of end cap 60. Parts which are similar or identical to those described in the embodiment of FIGS. 2 and 3 are identically numbered in FIGS. 4 and 4A.

Ball stud 64 includes a head portion 70 received within housing cavity 58 of socket housing 56. An expander 88 formed of a suitable polymeric material is placed against a lower (as viewed in FIG. 4) portion of head 70, but intermediate polar end 70a and bearing end 70b. FIG. 4B shows expander 88 in its uncompressed, relaxed condition. Expander 88 has a center opening 90, the periphery of which defines a circular seating surface 92 along an inner segment of pitched minor side surface 94a. A frustroconical major side surface 94b slopes in a direction away from the surface 94a and the top surface 94 of expander 88. Expander 88 has an outer base portion 94 and a concave inner surface 97.

Figure 4A:
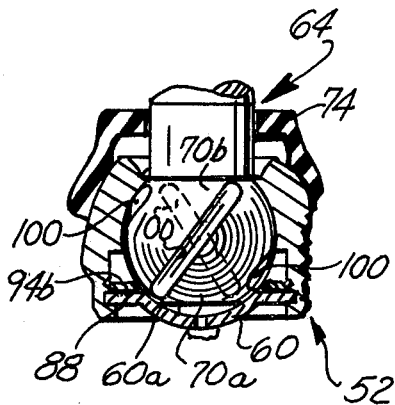
FIG. 4A is a view corresponding to FIG. 4, showing the joint after final assembly.

In accordance with a feature of the embodiment of the invention illustrated in FIGS. 4 and 4A, the head portion 70 of the ball stud 64 is provided with a plurality of arcuate grooves 100 which are utilized to conduct lubricant between a lower (as viewed in FIG. 4) portion of the cavity 58 and an upper portion of the cavity. It should be noted that the grooves 100 have a longitudinal extent which is sufficiently great to enable them to extend through the circular central opening 90 (see FIG. 4B) in the annular expander 88. Since the grooves 100 extend through the central opening 90 in the expander 88, the expander can not press against the spherical outer surface of the head 70 and block the transmission of lubricant from the lower portion of the cavity 58 to the upper portion of the cavity.

To assemble the ball and socket joint of FIG. 4, expander 88 is positioned against head 70 as shown in FIG. 4. End cap 60 (FIG. 4A) is placed against head 70 and a predetermined load is applied to end cap 60. Material from the sides of the housing is pressed radially inwardly and the lower extremity of socket housing is spun over the peripheral portion of end cap 60 to permanently secure it in place in the manner disclosed in U.S. Pat. No. 3,464,723. An end cap 60 is compressed against head 70 of stud 64, expander 88 is compressed between head 70 and cap 60 to the substantially flattened condition shown in FIG. 4A. End of 70a of head 70 is thus seated directly against the seating depression 60a of end cap 60, and also within circular bearing surface 92 of flattened expander 88. As with the FIGS. 2 and 3 embodiment, as the parts wear in use the fully compressed expander 88 expands against head 70 to progressively take over seating of head 70 and to maintain the assembly in proper engagement of parts. As in the other embodiments, expander 88 is the sole member interposed between head 70 and end cap 60 so as to be able to transmit bearing forces therebetween.

While the invention has been described in detail with reference to the specific embodiments thereof, it will be appreciated upon a reading and understanding of the foregoing description that numerous alterations and modifications will become apparent to those skilled in the art. It is intended to include all such modifications and alterations within the scope of the appended claims.

What is claimed is:

1. A ball and socket joint assembly comprises, a stud having an enlarged head and a socket having a housing, said housing including a cavity within which said head is received in bearing engagement, an end cap affixed to said housing and positioned in engagement with said head to urge said head into said bearing engagment with said cavity, an expander comprising the sole member interposed between said end cap and said head to transmit stud preloading force therebetween, said expander being compressed between said end cap and said head to provide a seat for said head and to take up wear by urging said head into said bearing engagement with said cavity, said expander having a central opening defined by an internal rim which is disposed in engagement with said head, said head having a bearing portion and wherein an area of head-expander contact is defined by the portion of the head engaged by said expander, and a liner bearing is provided between said cavity and said bearing portion of said head, said liner bearing terminating short of said area of contact, said expander being a belleville type spring, said opening being a center opening in said belleville type spring and the periphery of said opening serving as a seat for said head.

2. The assembly of claim 1 wherein said head extends through said opening into engagement with said end cap.

3. The assembly of claim 1 wherein is resiliently flexible from a substantially flat compressed condition toward a generally frustroconical configuration to compensate for wear of components of said joint assembly.

4. The assembly of claim 1 wherein said spring is made of a polymeric plastic material.

5. The assembly of claim 1 wherein said spring is made of metal.

6. A ball and socket joint assembly comprising a socket having a cavity disposed therein, a bearing surface area adjacent to an open end of said cavity, a ball stud having a spherical end portion disposed in said cavity in engagement with said bearing surface area, said ball stud having a shank portion extending outwardly of the open end of said cavity, an end cap connected with said socket and closing an end portion of said cavity opposite from said bearing surface area, spring means disposed in said cavity for resiliently urging said spherical end portion of said ball stud away from said end cap and into abutting engagement with said bearing surface area, said spring means including an annular spring member having a radially inner portion defining a circular central opening and disposed in engagement with the spherical end portion of said ball stud, said annular spring member having a radially outer portion disposed in engagement with an inner surface of said end cap and a pair of annular major side surfaces extending between said radially inner and outer portions, said spherical end portion of said ball stud including surface means for at least partially defining a groove in the spherical end portion of said ball stud, said groove extending through the circular central opening in said annular spring member to enable lubricant to move along the groove between opposite sides of the location where the radially inner portion of said annular spring member engages the spherical end portion of said ball stud.

7. A ball and socket joint assembly as set forth in claim 6 wherein said spherical end portion of said ball stud is movable away from said end cap from an initial position disposed adjacent to said end cap to a second position spaced from said end cap under the influence of said annular spring member upon the occurrence of wear in the ball and socket joint assembly, said radially outer portion of said annular spring member being disposed in engagement with the inner surface of said end cap at a location adjacent to a side wall surface of the socket cavity when said spherical end portion of said ball stud is in said initial position and being disposed in engagement with the inner surface of said end cap at a location spaced from the side wall surface of the socket cavity when said spherical end portion of said ball stud is in said second position.

8. A ball and socket joint assembly as set forth in claim 7 wherein said annular major side surfaces of said spring member extend outwardly away from the spherical end portion of said ball stud toward the inner surface of said end cap, said major side surfaces of said spring member extending at a first angle to a plane containing at least a portion of the inner surface of said end cap when the spherical end portion of said ball stud is in the initial postion and extending at a second angle to the plane containing at least a portion of the inner surface of said end cap when the spherical end portion of said ball stud is in the second position, said second angle being larger than said first angle.

9. A ball and socket joint assembly comprising a socket having a cavity disposed therein, a bearing surface area disposed adjacent to an open end of said cavity, a ball stud having a spherical end portion disposed in said cavity in engagement with said bearing surface area, said ball stud having a shank portion extending outwardly of the open end of said cavity, an end cap connected with said socket and closing an end portion of said cavity opposite from said bearing surface area, spring means disposed in said cavity for resiliently urging said spherical end portion of said ball stud away from said end cap and into abutting engagement with said bearing surface area, said spring means including an annular spring member having a radially inner portion defining a circular opening through which a portion of the spherical end portion of said ball stud extends, said radially inner portion of said annular spring member being disposed in engagement with said spherical end portion of said ball stud at a location disposed on a first side of a first plane extending through the center of the spherical end portion of said ball stud in a direction perpendicular to a central longitudinal axis of the shank portion of said ball stud, said shank portion of said ball stud being disposed on a second side of said first plane opposite from said first side, said annular spring member having a circular radially outer portion disposed in engagement with an inner surface of said end cap and a pair of annular major side surfaces extending between said radially inner and outer portions, said spherical end portion of said ball stud being movable away from said end cap from an initial position disposed adjacent to said end cap to a second position spaced from said end cap under the influence of said annular spring member upon the occurrence of wear in the ball and socket joint assembly, said annular major side surfaces of said spring member extending outwardly away from the spherical end portion of said ball stud toward the inner surface of said end cap, at least one of said annular major side surfaces of said spring member extending at a first angle to a second plane containing at least a portion of the inner surface of said end cap when the spherical end portion of said ball stud is in the initial position and extending at a second angle to the second plane when the spherical end portion of said ball stud is in the second position, said second angle being larger than said first angle.

10. A ball joint assembly as set forth in claim 9 wherein said radially outer portion of said annular spring member is disposed in engagement with the inner surface of said end cap at a location adjacent to a side wall surface of the socket cavity when said spherical end portion of said ball stud is in said initial position and being disposed in engagement with the inner surface of said end cap at a location spaced from the side wall surface of the socket cavity when said spherical end portion of said ball stud is in said second position.

11. A ball joint assembly as set forth in claim 9 wherein at least one of said annular major side surfaces of said spring member is disposd in a generally conical plane having its base disposed adjacent to the inner surface of said end cap and its peak disposed within a space enclosed by an outer surface area of the spherical end portion of said ball stud when the spherical end portion of said ball stud is in said second position.

12. A ball joint assembly as set forth in claim 9 wherein said first and second planes extend parallel to each other and are spaced apart by a distance which is less than the length of a radius of the spherical end portion of said ball stud.

* * * * *

UNITED STATES PATENT AND TRADEMARK OFFICE
CERTIFICATE OF CORRECTION

PATENT NO. : 4,035,094
DATED : July 12, 1977
INVENTOR(S) : Edward J. Herbenar

It is certified that error appears in the above–identified patent and that said Letters Patent are hereby corrected as shown below:

Column 7, line 59, after "wherein" insert --said expander--.

Signed and Sealed this

Fifteenth Day of November 1977

[SEAL]

Attest:

RUTH C. MASON
*Attesting Officer*

LUTRELLE F. PARKER
*Acting Commissioner of Patents and Trademarks*